United States Patent [19]
Davey et al.

[11] Patent Number: 6,044,770
[45] Date of Patent: Apr. 4, 2000

[54] INTEGRATED HIGH SPEED MAGLEV SYSTEM

[75] Inventors: Kent R. Davey, New Smyrna Beach, Fla.; Tony J. Morris, Marietta, Ga.

[73] Assignee: Park Square Technology, Ltd., Marietta, Ga.

[21] Appl. No.: 08/493,332

[22] Filed: Jun. 23, 1995

Related U.S. Application Data

[63] Continuation-in-part of application No. 08/169,484, Dec. 17, 1993, abandoned, which is a continuation of application No. 07/835,156, Feb. 12, 1992, Pat. No. 5,605,100, which is a continuation-in-part of application No. 07/601,109, Oct. 23, 1990, abandoned.

[51] Int. Cl.[7] ..................................................... B60L 13/04
[52] U.S. Cl. ........................ 104/282; 104/284; 104/285; 104/286; 104/292; 310/12
[58] Field of Search ................................ 104/282, 284, 104/285, 286, 290, 292, 294; 310/12, 13

[56] References Cited

U.S. PATENT DOCUMENTS

| | | |
|---|---|---|
| 2,412,512 | 12/1946 | Jones et al. . |
| 2,666,879 | 1/1954 | Godsey et al. . |
| 3,233,559 | 2/1966 | Smith et al. . |
| 3,470,828 | 10/1969 | Powell, Jr. et al. ........................ 310/13 |
| 3,662,689 | 5/1972 | Kawabe et al. ........................... 104/286 |
| 3,771,033 | 11/1973 | Matsui et al. . |
| 3,806,782 | 4/1974 | Matsui et al. ............................ 104/284 |
| 3,834,317 | 9/1974 | Miericke . |
| 3,904,941 | 9/1975 | Matsui et al. . |
| 3,913,493 | 10/1975 | Maki et al. . |
| 4,299,173 | 11/1981 | Arima et al. .............................. 104/284 |
| 4,641,065 | 2/1987 | Shibuki et al. ............................. 310/13 |
| 4,646,651 | 3/1987 | Yamamura et al. ..................... 104/281 |
| 4,779,538 | 10/1988 | Fujiwara et al. ......................... 104/282 |
| 4,913,059 | 4/1990 | Fujie et al. .............................. 104/282 |
| 5,085,149 | 2/1992 | Huson ..................................... 104/281 |
| 5,628,252 | 5/1997 | Kuznetsov .............................. 104/284 |

*Primary Examiner*—S. Joseph Morano
*Attorney, Agent, or Firm*—Levisohn, Lerner, Berger & Langsam

[57] ABSTRACT

An integrated MAGLEV (Magnetic Levitated Vehicle) system consists of permanent or preferably superconducting vehicle-mounted magnets which interact with both active and induced track-based currents. The magnets on the vehicle which are used for propulsion serve the dual purpose of realizing both levitation and lateral stabilization (guidance). The contribution offered by this invention is that it is able to provide propulsion, levitation, and guidance using a single type of track-based coil interacting with a singular type of magnetic field which is affixed to the vehicle. The realization of multiple functions with a single coil reduces the cost and enhances the efficiency of this MAGLEV system. In the main embodiment of this invention, propulsion currents are injected into brushes sliding along brush contact surfaces on the rail. Motion induced currents in the coils realize both the necessary levitation and guidance forces for the vehicle. The propulsion system is basically a linear DC motor and requires no power handling along the track. Necessary operating power can either be carried on the vehicle or collected by a third rail pickup system. All coils in the track are supported by a reinforced recycled plastic matrix (polyvinyl fiberglass) or similar material.

50 Claims, 17 Drawing Sheets

(a) PRESENT COIL DESIGN (b) PROPOSED COIL DESIGN – SWITCH EVERY OTHER COIL CONNECTION.

6,044,770

INTEGRATED HIGH SPEED MAGLEV SYSTEM

RELATED APPLICATIONS

This is a continuation-in-part of patent application Ser. No. 08/169,484 (abandoned) filed Dec. 17, 1993 which is a continuation of patent application Ser. No. 07/835,156 filed Feb. 12, 1992, now U.S. Pat. No. 5,605,100, which is a continuation-in-part of patent application Ser. No. 07/601,109 filed Oct. 23, 1990 (abandoned).

BACKGROUND OF THE INVENTION

This invention relates to the complete construction and design of a high or low speed MAGLEV (Magnetic Levitated Vehicle) system. Of central concern is the means by which propulsion, levitation and stabilization forces are provided to the vehicle.

Design Requirements of a MAGLEV System

Unlike the design of many conventional electric motors, a MAGLEV system must be sensitive to the fact that one side of the motor, either the rotor or the stator, is nearly infinite in length. Thus, the components, and the cost of the track in particular, is a much greater concern than is usually the case with a conventional motor, in which both the rotor and stator are comparatively small and of finite length.

Most high speed MAGLEV vehicles are projected to run at speeds of about 150–300 mph. Not only is the aerodynamic drag a key factor in the design of the vehicle, but magnetic drag is as well. The term magnetic drag refers to the forces exerted on the vehicle by eddy currents induced in the track acting against vehicle-based magnets. At low speeds in the neighborhood of 30 mph, this drag can constitute up to 200 to 300 per cent of the total drag, while at 300 mph it might constitute 5 per cent of the total drag. Magnetic drag should be minimized, whenever possible.

Of equal importance to the design of a MAGLEV vehicle is the issue of how levitation and stabilization will be achieved. By way of comparison, all commercial aircraft land at speeds less than 170 mph since the landing wheels can not withstand impact at higher speeds. Whatever mechanism is used to achieve the levitation and stabilization of a MAGLEV vehicle, it must be guaranteed to be fail-safe when a local power substation goes down. Similarly, it cannot depend on one or two superconducting magnets which have the possibility of quenching at any time. Lastly, there must a mechanism for transferring both propulsion power and service power (lighting, heating, air-conditioning, etc.) to the vehicle.

In summary, the targeted objectives for an efficient and viable MAGLEV system are as follows:

1. A low cost track. This is the element of the system which will constitute the greatest component of its costs.
2. Means for reducing unwanted eddy currents with their commensurate heating loss and magnetic drag.
3. Means for realizing efficient levitation and stabilization in a fail-safe mode. This means should be able to realize such levitation and stabilization at both high and low speeds--preferably without incurring undue additional cost to the system.
4. Means for delivering propulsion and service power to the vehicle.

Background Work

The background work in this area is quite extensive. Among the earliest patents proposed for a MAGLEV system is that by Maurice F. Jones and Lee A. Kilgore, U.S. Pat. No. 2,412,512 (1946). Their proposed system consisted of a laminated polyphased wound core in the vehicle which acted against a squirrel cage current rail extending the length of the track. This patent shares some features with that of Millard Smith and Marion Roberts, U.S. Pat. No. 3,233,559 (1966), which also proposed a linear electric induction motor as a means of propelling a vehicle down the track. Both suggestions suffer the problem of getting a large amount of power into the vehicle; this task might be possible at present using state of the art brushes. With the proposed squirrel cage arrangement, operation would not be possible without considerable magnetic drag loss. Frank Godsey and Maraca Jones, U.S. Pat. No. 2,666,879 (1954), suggest a similar configuration, but mount the windings along the length of the track; the vehicle need only carry a conducting sheet which would be sandwiched between these windings. The cost of such a MAGLEV configuration might be astronomical.

More recently, additional systems have been suggested which attempt to realize propulsion using linear synchronous motors. More notable among this group is the patent by Naoki Maid, et al, U.S. Pat. No. 3,913,493 (October 1975). Their system uses a linear synchronous motor in which track-based three phase coils interact with a vehicle-based magnetic coil group to realize the propulsion. Again, the cost of such a system could be extremely high.

Among the first groups to suggest an integrated system yielding levitational guidance and propulsion was that by Richard Thornton, U.S. Pat. No. 3,850,109 (November 1974). The vehicle was constructed with a number of long, thin superconducting coils which, when energized, would interact with "I" strips along the guideway to effect levitation. Propulsion was accomplished by interaction with other vehicle coils reacting with an armature based winding in the track. Although such a system would indeed realize levitation at very low speeds, along with propulsion, the cost could be very large. Moreover, if either of the two lift coils suffered a superconducting quench, catastrophic results would no doubt ensue.

In what might be summed up as possibly the most expensive MAGLEV system ever proposed, Ushio Kawabe and Hiroshi Kimura (U.S. Pat. No. 3,662,689 (May 1972)) suggest the use of a hard superconductor which is laid out along the length of the track and flooded with superconducting fluid. The superconductor would react against a vehicle-based magnet to induce eddy currents realizing both the levitation and stabilization. The superconductor was arranged in a box-like configuration underneath the vehicle. Also laid along the length of the track was a ladder structure. Current would be impressed from one side of the ladder, laid horizontally along the ground, to the other side of the ladder. A propulsion force would then be generated as a consequence of the interaction of the vehicle-based magnetic field with the current in this ladder using conventional Lorentz forces, i.e. $\vec{J} \times \vec{B}$. If one examines FIG. 5 of that patent more closely, it will become apparent that the superconducting magnet in the track underneath the solenoidal magnet is used to generate the propulsion/lift field in the vehicle. The interaction of the two fields will actually cause the magnetic field to be horizontally directed in the plane of the ladder. The $\vec{J} \times \vec{B}$ forces realized would be very small indeed. This parenthetical note is important because the propulsion forces realized by the present system are not unlike those which Kawabe was attempting to realize, but had failed to. In any event, the cost of his levitation system seems hopelessly unrealistic.

Kazumi Matsui, et al., in U.S. Pat. Nos. 3,771,033 (November 1973), and 3,904,941, (September 1975), outline a means for generating propulsion forces for a MAGLEV system using current conductors in a picket fence type arrangement in the presence of a homogenous field. These patents deserve mention because the propulsion system used in the present invention also incorporates currents passing through a picket fence arrangement of conductors lying within a homogenous field. The arrangement proposed however by Matsui is quite inefficient. Over the span of a single permanent magnet field, multiply directed currents are injected into these conductors in both directions to yield $\vec{J}$ $\vec{B}$ forces which are counterproductive. The proposed system overcomes this drawback and maintains a higher efficiency by allowing currents of like direction only to contribute over a common pole face of a vehicle-based magnet.

The last patent that will be mentioned in reference to mechanisms for generating propulsion forces is that of Osamu Shibuka, et al, U.S. Pat. No. 4,641,065 (February 1987). Their track consists of a rail of north-south magnets directing their flux in a predominately horizontal direction with the ground. A conducting rail of U-shaped cross-section fits around the magnets and is provided with a set of brushes for changing the direction of the current within a moving U-shaped coil. The brushes pick up current from the stationary feed line; the current interacts with the magnet field to generate the propulsion forces.

That system of propulsion is similar to one of the two embodiments used in the present invention for generating propulsion forces. The differences are quite important, however. Unlike Shibuka, the conductors in the present system are always fixed; the magnets are mounted on the vehicle to reduce the cost of the track. Secondly, the coil used in the present invention serves a multiplicity of roles and is itself a collection of four subcoils. They are never configured with a U-shaped cross section as is explicitly required in Shibuka's patent. These alterations and differences allow for a sizeable cost reduction of the system.

In addition to achieving the propulsion forces necessary for the vehicle, it is necessary to guarantee stabilized levitation. Almost all systems require a separate assembly of magnets or superconducting coils to achieve the levitation. For example, the 20 year old German Transrapid system has been using an attractive magnetic floater type arrangement similar to the one proposed by Sakae Yamamura, et al, U.S. Pat. No. 4,646,651 (March 1987). Generally, a piece of steel is run under the guideway of the track and an active electromagnet interacts with that piece of steel to maintain the gap at a specified setting. It is necessary in these arrangements for the vehicle to wrap around the track support structure to achieve an attractive support from below. The aerodynamic losses associated with wrapping the structure, however, are large. In addition, the track support structure must have a T-shaped cross section—yet, additional cost penalties are incurred with such a design. By contrast, the suspension and guidance system used in the present invention induces the necessary levitation and stabilization forces.

Among the first to propose the use of null flux coils in electromagnetic inductive suspension systems was J. R. Powell, U.S. Pat. No. 3,470,828 (October 1969). In actuality his proposed scheme used null flux coils to realize lateral side-to-side stabilization and isolated vertically oriented coils for the levitation forces. As the vehicle-based magnets are moved vertically with respect to these outboard coils affixed to the track, additional flux is induced in the coil to generate vertical restoring forces. A rather significant problem facing all MAGLEV designers is the issue of high speed magnetic drag. The currents induced in the vertical leviation coils do indeed yield the currents necessary to produce lift on the vehicle. Commensurate with this lift, however, is a sizable drag on the vehicle. By properly choosing the size of the null flux coils used in the Powell patent for stabilization, a large percentage of that drag can be eliminated. Well designed null flux coils have been shown to yield up to a 200 to 1 lift to drag ratio.

There are two patents by Shunsuke Fujiwara, US Pat. Nos. 4,779,538 (October 1988) and 4,913,059 (April 1990) which utilize null flux coils for both levitation and stabilization. In both patents, the vehicle runs down a long boxlike trough. Null flux coils are arranged along the vertical side walls of the trough to provide the levitation forces needed by the vehicle. The superconducting magnet is mounted on the vehicle and is in an orientation which drives flux horizontally through the vertical mounted null flux coils. Any displacement from the baseline equilibrium position induces currents in the coils, with commensurate forces which act to realign the magnets with respect to the null flux coils. An important part of those systems was the use of connections from the left wall of the track to the right wall of the track. By connecting the two sets of null flux coils on either side of the vehicle, it is possible to realize higher lateral side-to-side stabilization forces. Their final arrangement consisted of two sets of null flux coils, each set being arranged on either side of the vertical walls of the vehicle. The two sets are themselves joined together by connections across the track to realize a higher efficiency in side to side restorative stabilization. The aerodynamic losses associated with the vehicle running down such a contorted track, however, would be significant. Moreover, the cross connections of these null flux coils constitute a considerable additional cost in construction, since the coils must pass within or below the structure of the guideway.

By way of completeness it should be mentioned that inductive systems which do not use null flux coils have also been recommended. One such system is that of Jurgen Miericke, U.S. Pat. No. 3,834,317 (September 1974). Induction is the only principle used in this patent to realize both the vertical and horizontal restoring forces. Track-based coils induce currents in conducting plates which are arranged both vertically and horizontally down the length of the track. The drawback of that design is the presence of larger drag forces accompanying the lift.

OTHER SYSTEMS USING NULL FLUX COILS

Because the present invention employs a flux elimination principle similar to that of governing null flux coils, it is appropriate to refer to alternative systems that involve the null flux coil.

The following represents an extension of work which was presented at the IEEE Magnetics Conference-INTERMAG 95 (April 18–25, 1995 San Antonio, Tex. p.AT-09). FIG. 1 shows a vehicle 1 riding on two vertical rails 2 which are supported by a guideway structure 3 which is typically made of concrete based bulb "T" 's. The vertical track consists of castellated conducting members 8 and null flux coils 9. The vehicle has two types of magnets in it. The first is a transverse magnetic source 11 which drives flux across the vertical rail. The second set type are repulsive magnets 12 which have no flux being driven through the rail at its center plane.

A closer view of the rail structure 2 is shown in FIG. 2. The current injected into the castellated members 8 provides the propulsion current for the vehicle. It is returned at cross-over points 10 to the adjacent rail. As the transverse magnets 11 translate past the null flux coils 9, currents are induced in the null flux coil as depicted in FIG. 3. These currents interact with vehicle-based transverse magnetic sources to yield high lift forces and small drag forces.

An alternative to using a castellated track is the series of "I" conductors shown in FIG. 4. Here the propulsion currents are driven into a brush contact surface 17. The currents are forced down these "T" shaped conductors each of which is insulated from its neighbor by an insulated spacer 18. The use of brushes and a brush contact surface greatly reduces the power handling problems and cost along the MAGLEV track.

FIGS. 1–4 have been detailed to illustrate major problems commensurate with the use of null flux coil topology. Among the disadvantages associated with that system are the following:

1. Two types of magnetic field sources are necessary on the vehicle. The repulsive magnetic field source 12 serves only to generate guidance or lateral stabilization for the vehicle, but constitutes an additional weight burden, as far as lift and propulsion is concerned.

2. The system requires two types of conductors or coils in the track. The castellated conductors 8 or the "T" conductor 17 serves the role of providing propulsion for the vehicle. The "figure eight" coils serve the role of providing currents which are passively induced to yield levitation and guidance. From a construction and cost perspective, it would be more advantageous if a single coil could serve all three roles.

3. The flux path associated with the use of transverse magnets 11 is not conducive to a light weight vehicle. The pole face area required for sufficient operation of such a system is quite large, being at a minimum 2–3 ft$^2$. A properly designed magnetic flux path requires a relatively large cross-sectional area of back iron to complete its path over to the next pole face. This type of magnetic field source is described as a dipole. The field falls off as the reciprocal distance cubed away from the dipole. Thus, it constitutes a secondary disadvantage in that shielding in the passenger compartment becomes somewhat problematic. It would be more beneficial if the magnetic fields were a quadrapole or octapole type field which falls off much more rapidly away from the source.

4. The castellated track approach requires the power to be injected into the rail from the wayside. The current must be injected with the proper phase with respect to the vehicle position; therefore, such an approach requires the use of transducers and complex power handling. The use of brushes and contact surfaces eliminates this complication and reduces the complexity of the system. Thus, the variant brush surface 17 which allows for current injection via brushes (as depicted in FIG. 4) offers a considerable advantage which should be retained if at all possible in the present invention.

SUMMARY OF THE INVENTION

These and other problems and disadvantages associated with the prior art are to a large extent overcome by the invention disclosed herein. The driving motivations behind the invention are the items listed in the previous section, those being to minimize the cost of the track, to realize levitation and stabilization in a fail-safe, cost-effective manner, to eliminate eddy current losses which produce additional magnetic drag, and to realize a means for delivering the power for propulsion and secondary service to the vehicle.

The basic embodiment of this invention is shown in FIG. 5a. It utilizes a vehicle 101 which moves over a track having two vertical rails 102. The track is supported by a guideway structure 103. Extending from the vehicle 101 are magnetic sources 104 which are configured to flank each of the vertical rails 102. The rails 102 house coils 105. Thus, as depicted in FIGS. 5a–c, as the vehicle 10 travels along the track, magnetic sources 104 extend downward from the vehicle 101, each source flanking one of the vertical rails 102 and, of course, flanking the composite coil 105 housed within it.

The first departure from the conventional prior art is to employ vertically stacked magnets as the magnetic source in this design, with dissimilar magnetic pole faces one on top of the other. Using vertically stacked magnets accomplishes two objectives. First, it eliminates the return flux from transverse magnet 11 which formerly travelled axially down the track in FIG. 1. Second, it contains the flux more effectively over the height of the vertical rail, and thus eases the difficulty of shielding.

With this configuration of magnets, the use of null flux coils will no longer be suitable to passively generate levitation forces for the vehicle. A new type of coil must be employed for this purpose, a coil which is, in fact, a composite collection of subcoils and thus will be referred to as the composite coil. This composite coil consists of four smaller coils which are connected in parallel as shown in FIG. 8a and 9a. Propulsion is realized in a manner likened to that depicted in FIG. 4 by brushes which inject current into the parallel connection points of the composite coil. The closed electrical circuit created by the parallel connection of the subcoils will have currents induced in it as magnets are translated past it. As will be apparent to one of ordinary skill in the art, proper placement of these coils with respect to the magnetic field source generates both levitation and guidance forces passively. Lower resistance coils with higher L/R ratios yield greater lift at lower speeds.

The stacked magnets have a sizable leakage flux from the upper magnet to the lower. As the composite coil is laterally displaced so that it becomes closer to the magnetic field sources on the left side of the vehicle with respect to the right, currents will be induced in the composite coil due to this leakage flux which acts to generate forces which re-enter the composite coil.

Because the guidance and lift forces are realized by eddy currents which are induced by the translation of magnets or a magnetic source past the coil, no lift or guidance is realized at low speeds (i.e., less than 30 MPH). Thus, an alternative means for generating both levitation and guidance must be sought. The simplest and most cost-efficient solution is to simply use wheels affixed to the vehicle. These wheels conceptionally mount within the outer frame of the vehicle and project only slightly past the outer skin. Alternatively, they can be retracted as with conventional aircraft vehicles. This type of eddy current induced lift is similar to that obtained with conventional null flux coils; both return a relatively high Lift/Drag ratio, except at very low speeds. There is a speed at which the drag peak is large (approximately 20 MPH). It is advisable to operate the vehicle at low speeds at the so called null flux point, the height at which the magnetic field sources induce no currents in the composite coil. The guideway can be constructed so that at speeds in excess of the maximum drag speed point, the guideway structure would be lowered with respect to the midline of the composite coils allowing the vehicle to induce currents and provide lift for itself. Horizontally directed wheels braced against the guideway substructure or the rail are necessary to provide for lateral guidance at low speeds. They too can be withdrawn as the vehicle speed increases and becomes adequate to provide for its own stabilization. A more costly alternative to using wheels to realize levitation at low speeds is to insert an additional coil in the vehicle into which current is injected via the brushes to provide additional lift as currents interact with the same magnets in the vehicle.

Among the advantages realized by this system are the following:

1. One composite coil effects the three functions of propulsion, levitation, and guidance.
2. The stacked magnet design lends itself to an efficient low reluctance path and eases requirements placed on magnetic shielding of the passenger compartment.
3. No cross connections of the composite coils from rail to rail are required, in contrast to Fujiwara U.S. Pat. No. 4,913,059 (April 1990).
4. The system lends itself to the use of brushes and contact surfaces, which eliminates the need for power circuitry handling along the track and complex position sensoring equipment.

An assessment of how well the targeted objectives outlined in the design requirements of this invention have been realized serve as a fitting conclusion to this summary.

The first objective was that of a low cost track. By using passive coils impregnated in a recycled plastic matrix in the track, the cost is indeed minimal because the track is passive, and the requirement of periodic power handling along the length of the track is eliminated.

The second objective was to reduce unwanted eddy currents, and the heating and magnetic drag which they cause. From field theory arguments, it is possible to show that if copper wire is used to wind the coils, each strand of which is no larger than 0.13" in diameter, the eddy current heating loss can be kept to less than 10% of the $I^2R$ losses commensurate with propulsion.

The third requirement was an efficient means for generating lift and stabilization. The null flux like composite coils deliver levitation and guidance passively by induction, and can theoretically deliver high lift to drag ratios. Because this lift and guidance is being generated by a coil that is also used for propulsion, an overlap with the objective of having a low cost track is achieved.

The final requirement involved power delivery to the vehicle and to the track. By using a brush current injection, the need for position sensors along the track is eliminated as well as the required complex multi-frequency power handling along the track. Getting the power into the vehicle is usually achieved using a third rail pickup system or alternatively, with onboard generation equipment.

BRIEF DESCRIPTION OF THE DRAWINGS

FIG. 9e(b) is a plan view of an improved design for a brush system in which switching the connections of certain composite coils to the brush collector plates results in a series connected brush system using only leading and trailing brushes, and eliminating the need for intermediate brushes.

DETAILED DESCRIPTION OF THE INVENTION

Figure 1:
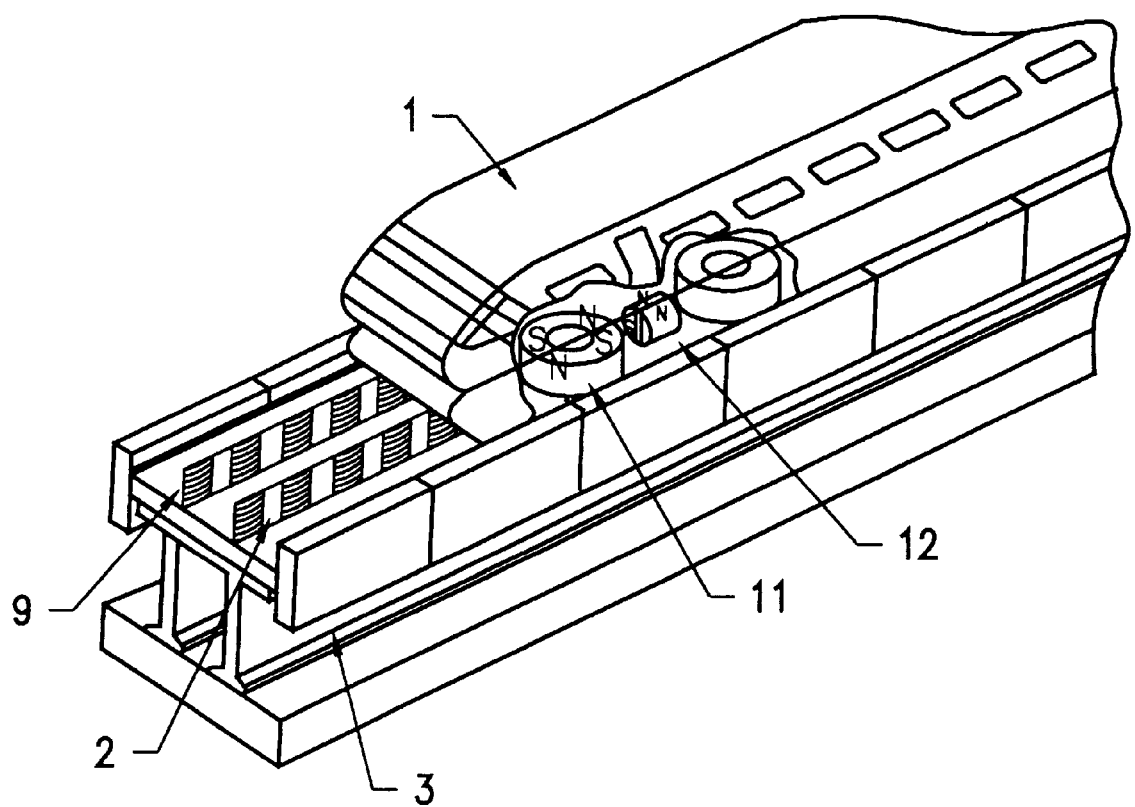
FIG. 1 is a partial perspective view of a MAGLEV vehicle as in the prior art, showing a possible layout of the transverse and repulsive magnets straddling the vertical track structure.
Figure 2:
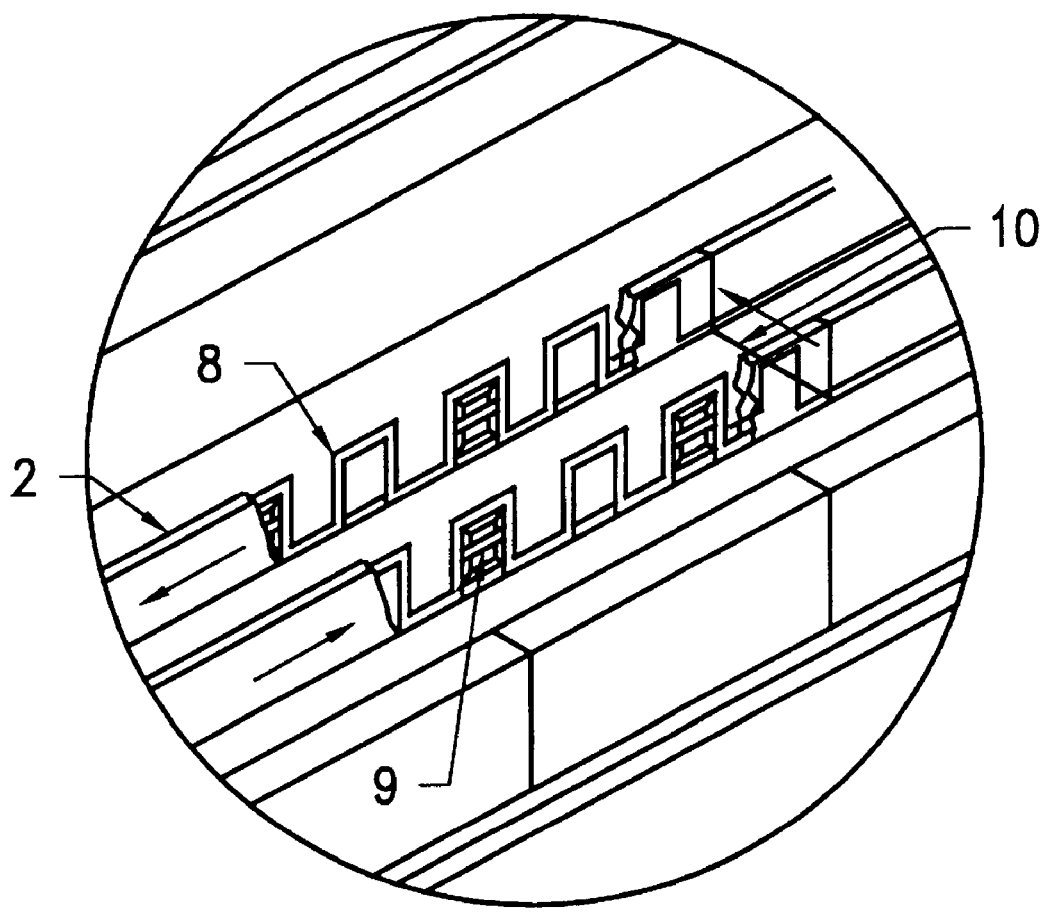
FIG. 2 is a partial, enlarged cross-section of the castellated track and null flux coils of FIG. 1, showing excitation near the end of one length of the track. A cross-over conductor is used to return the current over the adjacent track.
Figure 3:
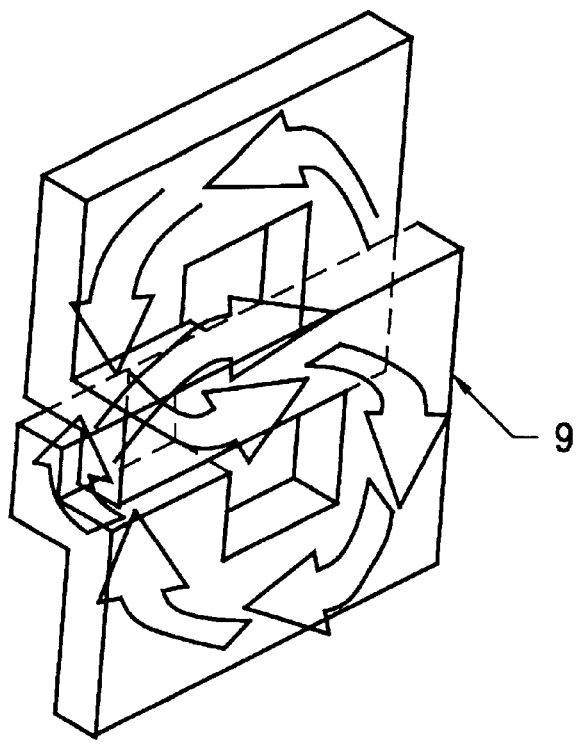
FIG. 3 is an enlarged, perspective view of a null flux coil as in the prior art. The current induced in a null flux coil is always such as to allow induced currents to constructively add over the horizontal central member of the figure.
Figure 4:
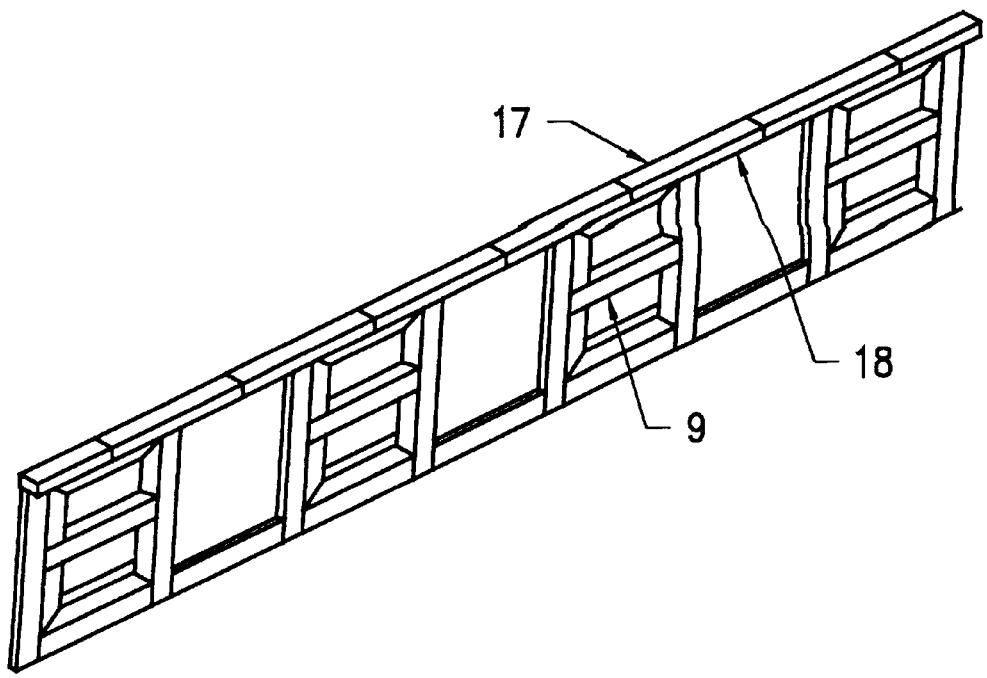
FIG. 4 is an enlarged, partial layout of the track structure appropriate for excitation of the track by brushes as in the prior art. Each of the T-shaped conductors is separated from its neighbor by a small spacer. These T-shaped conductors are used in place of castellated conductor segments.
Figure 5B:
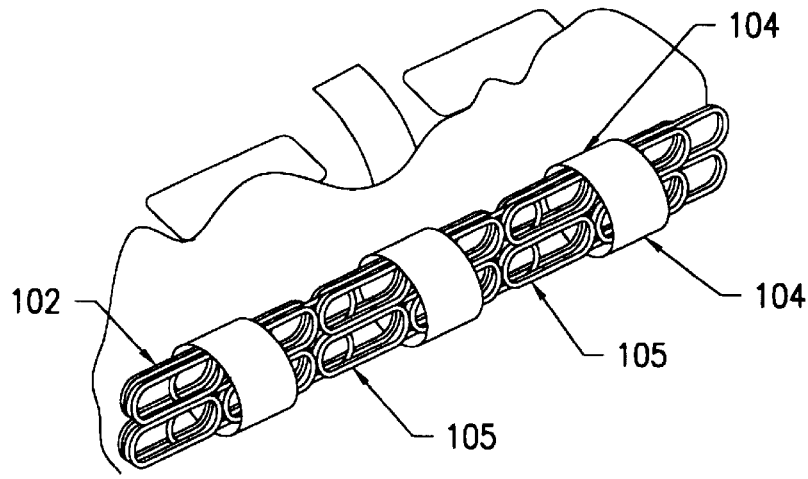
FIG. 5b is an enlarged perspective view of the vertical rail, showing the magnets flanking the rail and the composite coils housed within the rail.
Figure 5A:
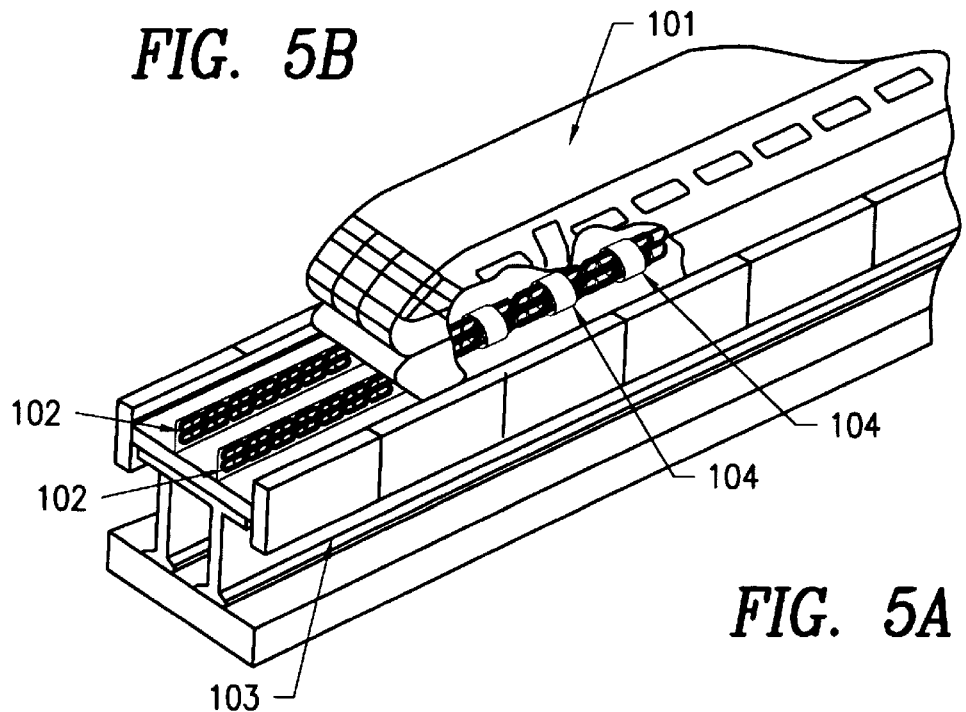
FIG. 5a is a partial perspective view of a MAGLEV vehicle of the present invention, showing the vehicle riding on a track, with the magnetic source extending from the vehicle to flank a vertical rail.
Figure 5C:
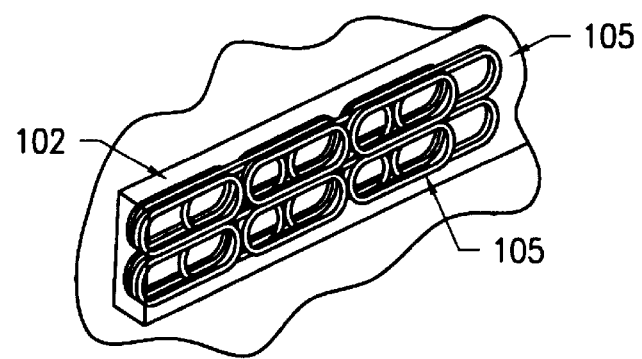
FIG. 5c is an enlarged perspective view of the vertical rail showing the composite coils housed within.

As described above, the basic embodiment of this invention is shown in FIG. 5a. The preferred embodiment utilizes a vehicle 101 which moves over a track having two vertical rails 102. The number of rails can, of course, be modified, if desired. The track is supported by a guideway structure 103, typically made of a concrete based material. Extending from the vehicle 101 are magnetic sources 104 which are configured to flank each of the vertical rails 102. The rails house coils as shown in FIG. 5a–c. Thus, as depicted in FIGS. 5a–c, as the vehicle 101 travels along the track, magnetic sources extend downward from the vehicle 101, each source flanking one of the vertical rails 102 and, of course, flanking the composite coil 105 housed within it.

Current is provided to the composite coil, typically using a brush injection system. The magnetic field sources and the composite coil interact to provide propulsion, levitation, and guidance forces to the vehicle. In contrast to the prior art, the present system allows these forces to be generated and induced using a single type of coil, and a single type of magnetic source. The advantages of this design, are therefore quite significant.

Figure 6A:
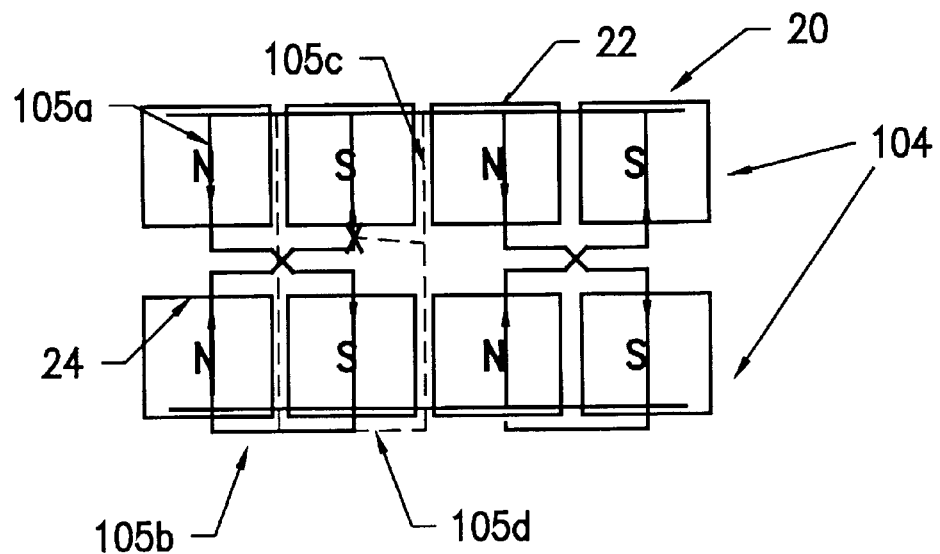
FIG. 6a is a schematic representation of the stacked magnet design of the present invention.

A major departure from prior art designs as detailed in the Background of the Invention, is the use of stacked magnets 20, as depicted in FIG. 6a, as the magnetic field source 104. With the magnets stacked reversing in polarity as shown, it is necessary to reverse the currents in the coils, as well. This is achieved by "stacking" the subcoils of the composite coil 105 as shown in FIG. 6a. Current injected into the stacked coils 24 generates the necessary propulsion currents for the vehicle.

As shown in greater detail in FIG. 6a, in the preferred embodiment the composite coil arrangement of four subcoils has a half coil (represented by the solid line) of two stacked subcoils (105a and 105b) placed in a first vertical plane closer to one side of the rail, and a half coil (represented by the dashed line) of two stacked subcoils (105c and 105d) in a second vertical plane closer to the opposite side of the rail. (The depiction of this arrangement of the half coils into two parallel planes is presented in a perspective view within FIG. 6a.) These four subcoils (composed of two planes of two subcoils each) are all connected in parallel to form a single composite coil. As described in greater detail below, a single rail will have composite coils extending down the length of the rail, and multiple composite coils across the rail's width. The composite coils are electrically connected together in series down the length of the rail, while the four subcoils of each composite coil are connected in parallel.

As further depicted in FIG. 6a, a brush contact surface 22 is provided just above the magnets. Brushes will ride upon the brush contact surface, and move along that surface with the motion of the vehicle. These brushes inject current into the coil, providing the current for propulsion.

Figure 6B:
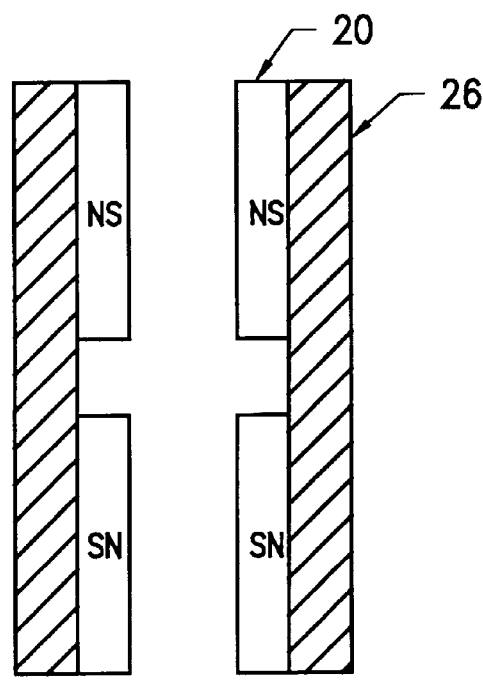
FIG. 6b is a vertical cross-sectional view of the stacked magnet design.

A side view of the magnets employed in this geometry is shown in FIG. 6b. The figure displays the vertical downward extension of the magnetic source from the MAGLEV vehicle. The vehicle itself is not expressly shown in this figure; however, the figure should be considered in conjunction with FIG. 5.

As shown in FIG. 6b, the magnets of the magnetic source are vertically stacked with dissimilar magnetic pole faces one on top of the other so that adjacent magnetic pole faces are opposite in polarity. The use of vertically stacked magnets eliminates the return flux from the transverse magnet configurations of prior designs (which return flux formerly travelled axially down the track), and more effectively contains the magnetic flux over the height of the rail, thereby easing the difficulties of shielding. In the preferred embodiment of the present invention, the stacked magnets 20 are fixed to back iron 26, as shown in FIG. 6b, to lower the reluctance of the return magnetic path. The height of this structure is approximately 15".

Figure 7:
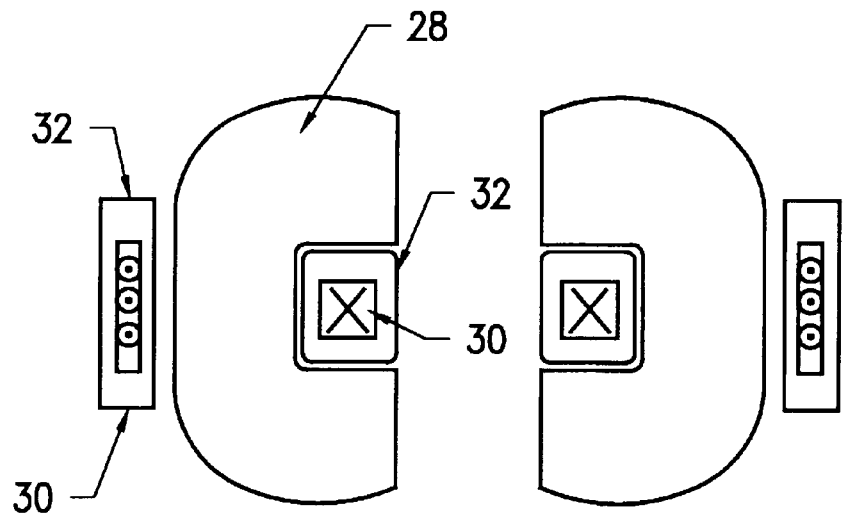
FIG. 7 is a vertical cross-sectional view of the stacked superconducting electromagnet design of an alternate embodiment.

An alternative to the use of conventional magnets is that shown in FIG. 7. As shown in cross-section in this figure, an iron core 28 is wrapped with superconducting wire 30 to produce the magnets of the magnetic source, the wire itself being enclosed by a helium dewar 32. Although the example shown is one possible configuration, numerous other arrangements using superconducting materials will, of course, be apparent to those skilled in the art.

Figure 8A:
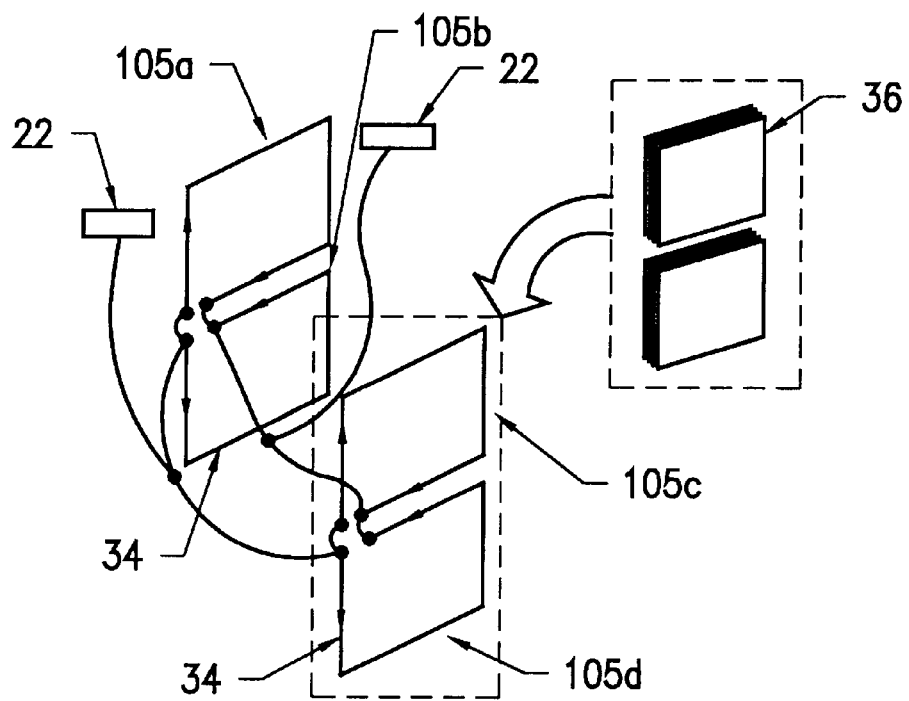
FIG. 8a is a schematic of the composite coil, showing connection of four multi-turn subcoils to form a single composite coil which is used to produce propulsion, lift and guidance.

FIG. 8a shows a view of the composite coil which serves the triple role of providing propulsion, levitation, and guidance. The composite coil 105 is comprised of four subcoils 105a–d, arranged in two planes 36 of two subcoils per plane. The subcoils are connected in parallel with brush leads also being soldered into the same connection points. The arrows on the subcoils in FIG. 8a (not the lead lines) depict the direction of current flow for propulsion only. Additional currents will be induced in these coils depending on their position and speed relative to the magnets in the vehicle. It is these induced currents that produce the levitation and guidance forces acting on the vehicle. (The current flow for levitation and guidance is depicted in FIGS. 8c and 8d.)

Figure 8B:
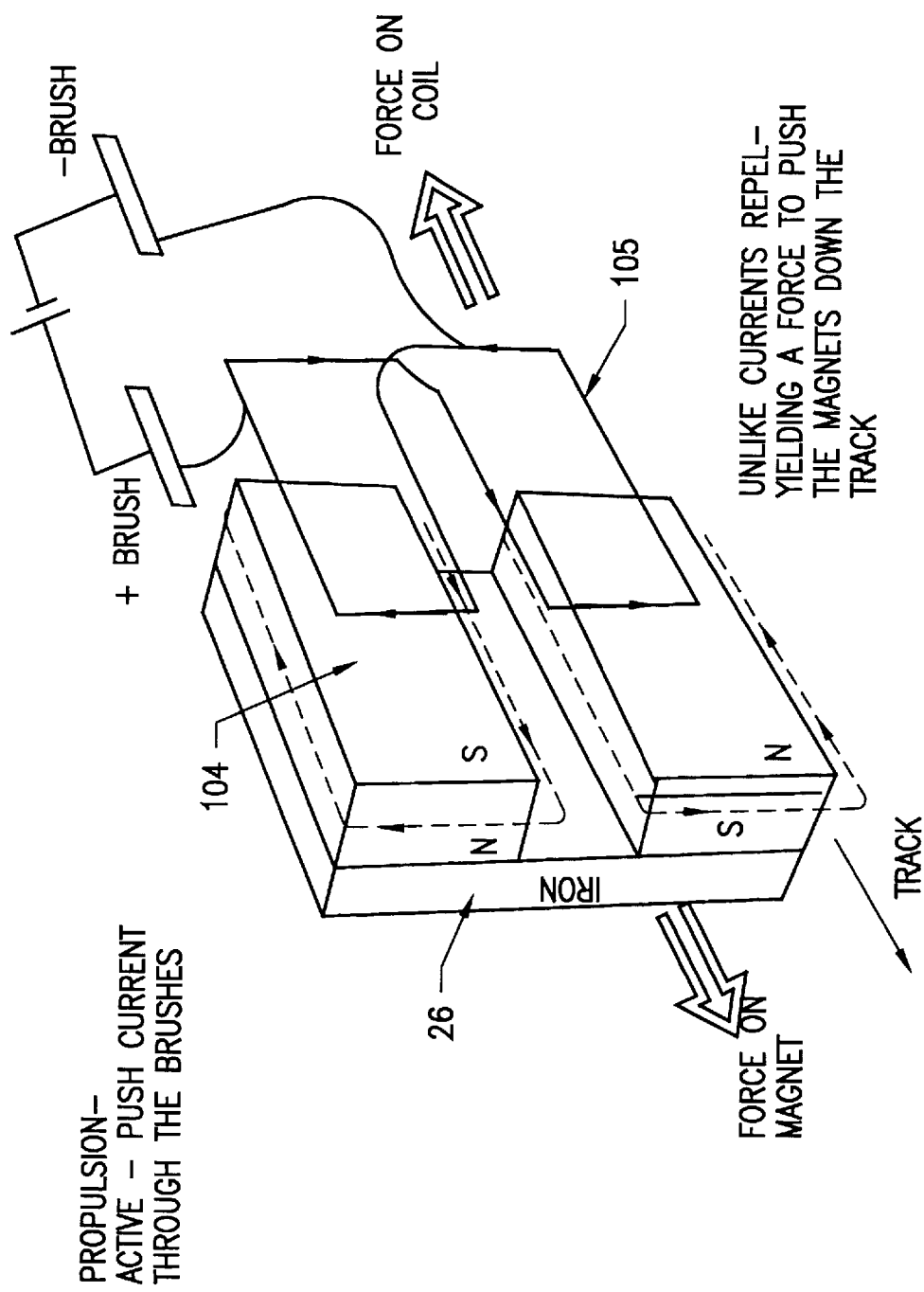
FIG. 8b is a partial schematic demonstrating the generation of propulsion forces by the interaction of the magnetic source and the coil.
Figure 8C:
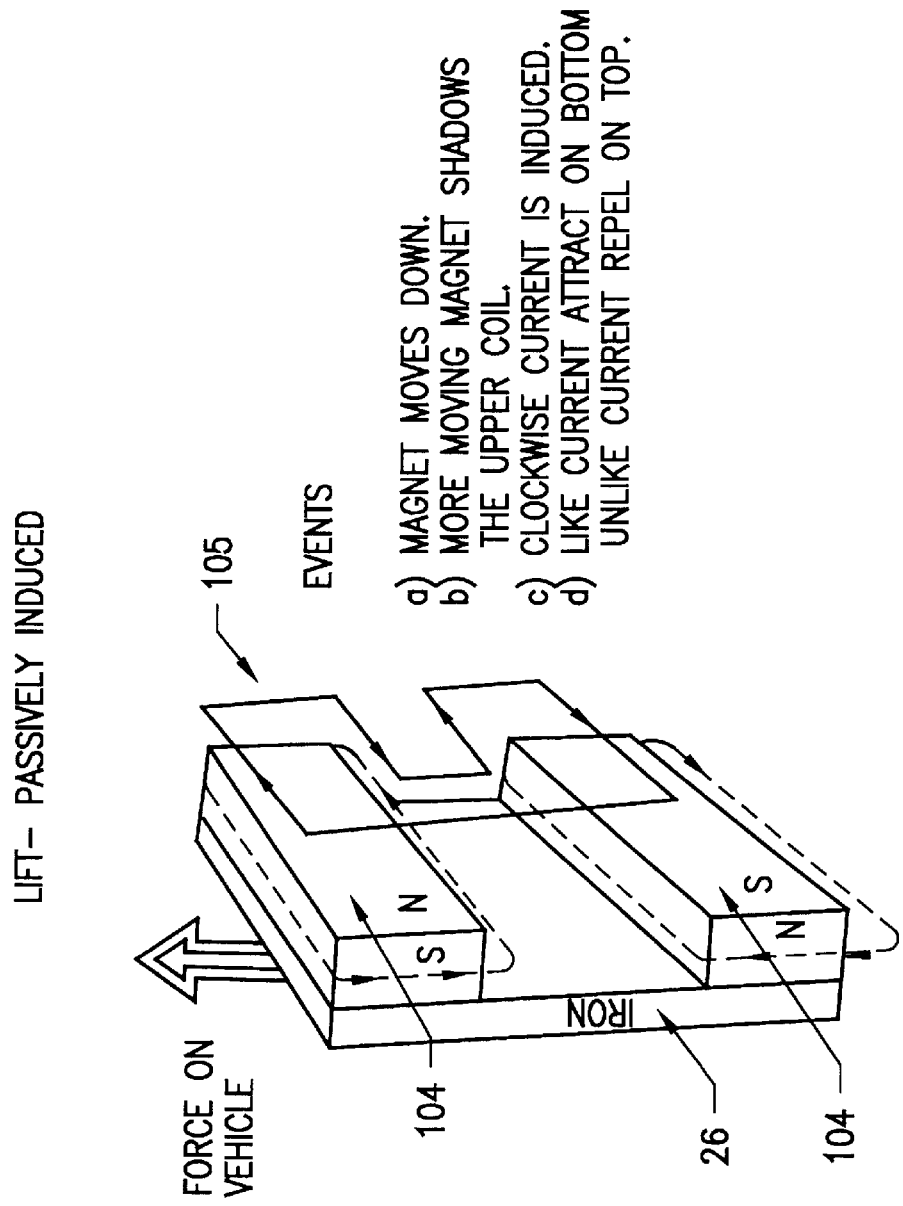
FIG. 8c is a partial schematic demonstrating the inducement of lift forces by the interaction of the magnetic source and the coil.
Figure 8D:
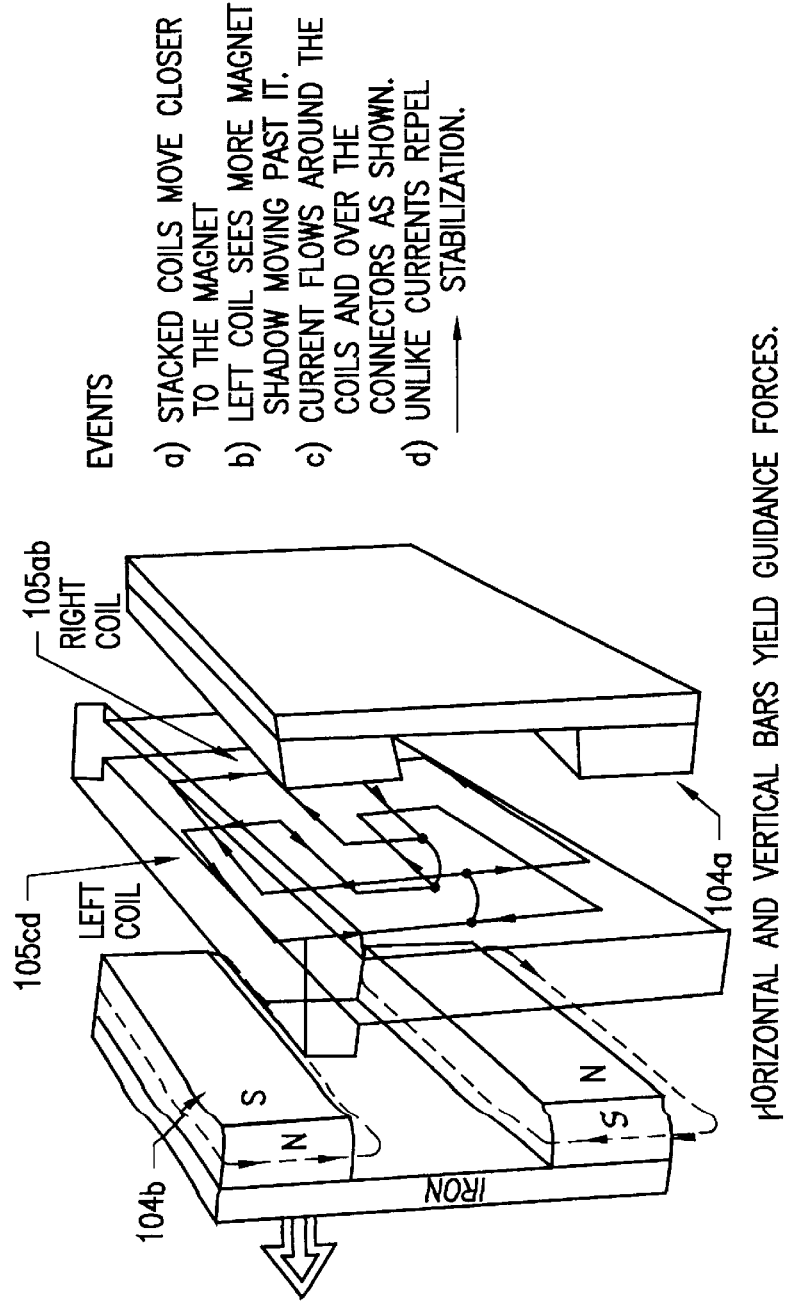
FIG. 8d is a partial schematic demonstrating the inducement of guidance forces by the interaction of the magnetic source and the coil.

The propulsion, levitation, and guidance forces which result from the interaction of the coils and the magnetic sources are shown in greater detail in FIGS. 8b through 8d.

The generation of propulsion forces is shown in FIG. 8b. As depicted therein, the magnets of magnetic field source 104 are fixed to backiron 26, and flank composite coil 105. (Only half the magnetic source 104 and composite coil 105 are shown.) Brushes are utilized to deliver current to the composite coil 105. Injection of current into the composite coil 105 in the direction shown by the arrows actively produces a magnetic field around the coil, resulting in repulsion between the coil and the magnetic field source, propelling the magnetic source (and the vehicle affixed thereto) down the track. Or, stated in another manner, as shown in the figure, unlike currents repel, yielding the propulsion force.

The interaction of the magnetic field source and the composite coil to produce lift is shown in FIG. 8c. As depicted therein, lift is passively induced by the interaction of the magnetic source and the coil, in contrast to the active generation of propulsion forces shown above. The magnets of magnetic field source 104 are affixed to backiron 26, and flank composite coil 105. (Only half of the magnetic source 104 and composite coil 105 are shown.) As the magnets move downward under the weight of the vehicle, the moving magnet shadows the upper portion of the composite coil 105 inducing a current in the coil 105, as shown by the arrows on the coil in FIG. 8c. The current in the coil results in a magnetic field producing a lift force on the magnetic source. Or, stated in another manner, as shown in the figure, like currents attract on bottom and unlike currents repel on top, producing the vertical lift force.

The guidance forces on the vehicle are depicted in FIG. 8d. Like the lift forces, guidance is passively induced. The magnets of magnetic field source 104 (i.e. 104*a* and 104*b*) flank composite coil 105 (i.e. half coils 105*ab* and 105*cd*), with the right half 104*a* of magnetic source 104 adjacent to the right half-coil 105*ab* of composite coil 105, and the left half 104*b* of magnetic field source 104 adjacent to the left half-coil 105*cd* of composite coil 105. The rail is intended to be centered between the two halves 104*a* and 104*b* of magnetic source 104. Looking at the left half 104*b* of the magnetic source for illustration purposes, movement of that half or side closer to the composite coil will induce a current in left half-coil 105*cd*. The induced current results in a magnetic field opposing the direction of movement of left half 104*b* of the magnetic source 104, resulting in a restoring force on the vehicle, recentering the source around the coil. The dynamics of movement of the right side 104 of the magnetic source 104 are analogous. Or, stated in another manner, as shown in the figure, unlike currents repel, yielding the stabilization force.

Figure 9A:
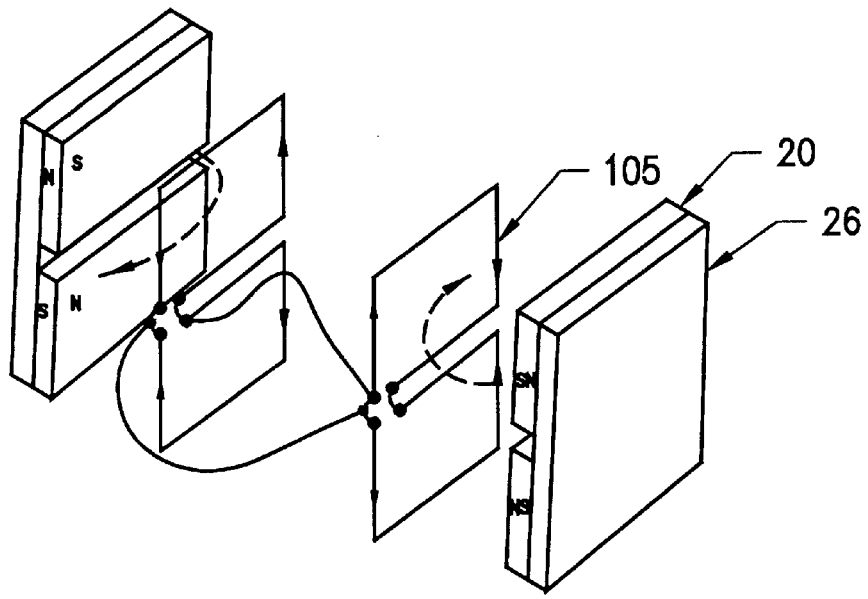
FIG. 9a is a partial schematic of the composite coil between the stacked magnets, and demonstrating how currents are induced to deliver guidance with repulsion magnets.
Figure 10:
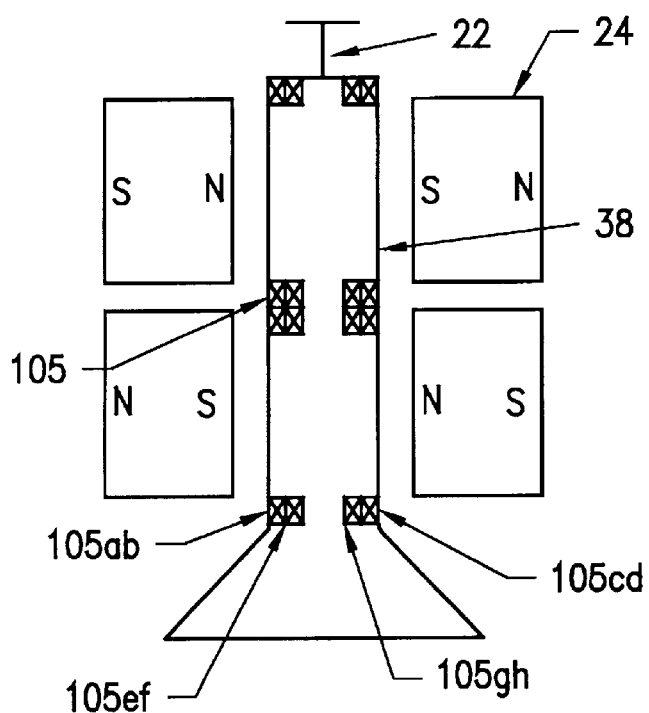
FIG. 10 is a vertical cross-sectional view of an inverted pultrusion to enhance electrical and thermal performance.

FIGS. 9*a* and 10 depict the placement of each composite coil between the stacked magnets 20 fixed to the back iron 26. The composite coils 105 are affixed in a rail pultrusion 38. One such positioning of the coils in a pultruded rail is depicted in FIG. 10. The pultrusion 38 houses the assembly of the subcoils which comprise the composite coils. The upper cap section of the pultrusion contains a brush contact surface 22 within which a brush from the vehicle will ride to force the propulsion current into the composite coil.

Figure 11:
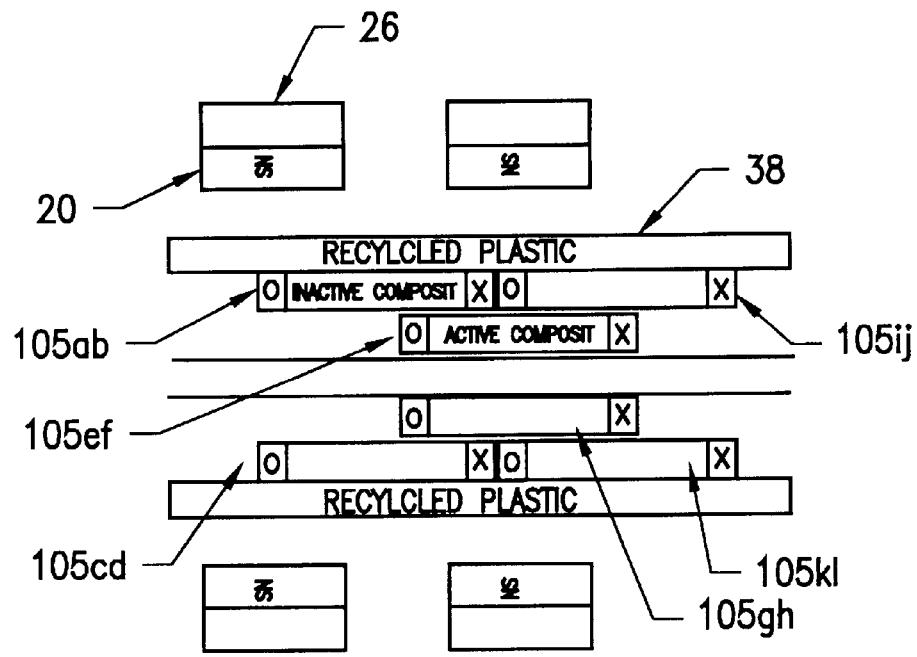
FIG. 11 is a top plan view of the rail showing the composite coil positioning with respect to the magnets, and showing the "staggering" or horizontal overlap of composite coils in adjacent horizontal rows.

FIG. 11 depicts a top view of the rail showing the composite coil positioned with respect to the magnets. Note that it is preferred that the composite coils be arranged in the rail in pairs such that a single composite coil is always displaced axially from its inboard mate. In other words, as shown in FIG. 11, the composite coils are "staggered" such that they horizontally overlap down the length of the rail.

More specifically, a rail of recycled plastic may be said to have at least four horizontal rows of subcoils within it. As shown in FIG. 11 (as viewed from the top of the rail looking down), half-coils 105*ab*, 105*cd*, 105*ef*, 105*gh*, 105*ij*, and 105*kl* are each composed of two subcoils. Half-coils 105*ab* and 105*cd* are connected to form a first composite coil; half-coils 105*ef* and 105*gh* are connected to form a second composite coil; and, half-coils 105*ij* and 105*kl* are connected to form a third composite coil. The composite coils 105*abcd*, 105*efgh* and 105*ijkl* are electrically connected in series, while the four subcoils of each composite coil are electrically connected in parallel. (In other words, subcoils 105*a*, 105*b*, 105*c* and 105*d* are connected in parallel; subcoils 105*e*, 105*f*, 105*g* and 105*h* are connected in parallel; and, subcoils 105*i*, 105*j*, 105*k* and 105*l* are connected in parallel). The first and third composite coils (the "outboard" coils) have their subcoils in the outer rows of the rail, while the second composite coil (the "inboard coil") has its subcoils in the inner rows of the rails. A typical rail will, of course, have many composite coils connected down the length of the rail; the figure shows a cut-away of only three composite coils merely for illustration purposes.

Thus, the second composite coil 105*efgh* is axially displaced or staggered with respect to the first composite coil 105*abcd*, and is similarly staggered with respect to the third composite coil 105*ijkl*. All of the inboard coils are, in fact, staggered with respect to the outboard coils. The use of brushes necessitates this staggering of the composite coils so as to yield a smooth transition of the injected current from one contact surface to the next. In addition, the staggering of the composite coils yields a smooth and continuous lift and guidance force for the vehicle.

The arrangement of the coils and subcoils across the rail may also be seen in FIG. 10. As shown therein, half-coils 105*ab*, 105*cd*, 105*ef* and 105*gh* are horizontally arranged across a rail. The outer set of half-coils 105*ab* and 105*cd* are connected to form a first composite coil 105*abcd* (the parallel connection is shown in FIG. 8), while the inner set of half-coils 105*ef* and 105*gh* are connected to form the second composite coil 105*efgh*. As discussed in relation to FIG. 11, the inner sets of composite coils are staggered with respect to the outer sets of composite coils in the rail.

Figure 9B:
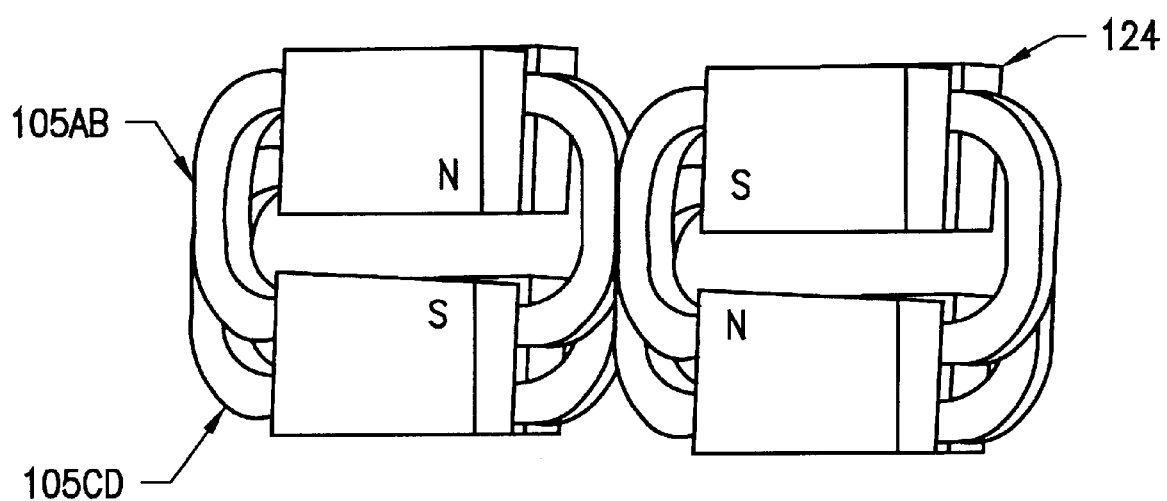
FIG. 9b is a perspective view of the interleaved composite coil arrangement.

A further improvement to the composite coil arrangements discussed previously is to interleave or vertically overlap the composite coils as shown in FIG. 9*b*. As shown in this figure, composite coil 105 is composed of half-coils 105*ab* and 105*cd*. It should be appreciated that 105*ab* and 105*cd* each represent two subcoils of the composite coil, as in the embodiments discussed above, and that all four subcoils are connected to form a single coil as shown in FIG. 8. In contrast to the embodiments previously described, however, the half-coils no longer have their upper and lower edges aligned. Rather, one half-coil is elevated with respect to the second, resulting in an "upper coil" (i.e. an upper half-coil) 105*ab* and a "lower coil" (i.e. a lower half-coil) 105*cd*. The upper coil and lower coil are connected together to form a single composite coil.

The interleaved composite coils 105 continue to be connected in series as with the stacked coils, however, by interleaving each of the coils so that a segment of the upper coil and a segment of the lower coil share the same magnet face 124 (as shown in FIG. 9*b*), a significant increase in lift force can be realized. The reason for this increase is two fold. First, twice as much current of the correct phase is induced in the coils and exposed to the correct magnet face to produce lift force. Second, the mutual coupling between the two coils is significantly enhanced; the enhanced inductance in these two coils helps to maintain a 180° electrical phase shift between the equivalent currents on the magnet and the induced currents in the coil. This 180° phase shift is more useful for producing lift force.

Figure 9C:
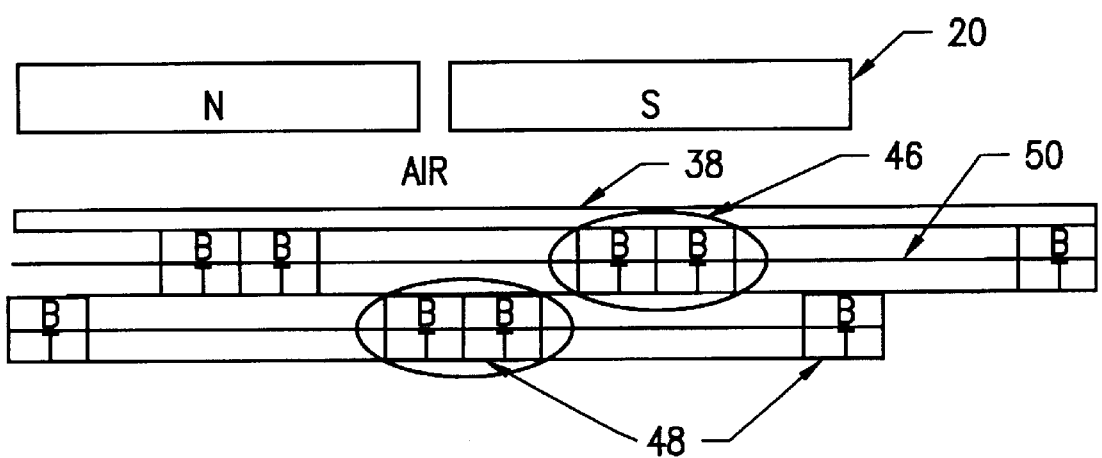
FIG. 9c is a top view of the interleaved composite coils showing a pole patch phase shift between coil pairs.

These interleaved or vertically overlapped composite coils must themselves be placed in the track with pole shifted pairs. As shown in FIG. 9*c*, "T" refers to an upper or top coil, and "B" refers to a lower or bottom coil. The figure shows a top view of half of the rail, with the magnetic source flanking one side of the rail. The composite coils of one horizontal row 46 are placed at a 90° electrical phase shift from the composite coils of an adjacent horizontal row 48. The 90° electrical phase shift between these rows of composite coils is necessary for proper excitation of the composite coils with the brushes.

It is also preferred that the interleaved composite coils of one horizontal row 46 be staggered or horizontally overlapped with the composite coils of an adjacent horizontal row 48. In addition, like the stacked coil arrangement, the arrangement of both coils can be suspended in a poly vinyl fiberglass sheath 38 and filled with an adhesive filler 50. Further description of the overlapped composite coil is provided in Appendix A, which is incorporated herein by reference.

With respect to the magnetic source affixed to the vehicle, it is desirable both from a lift and propulsion perspective to arrange the magnets in clusters, cyclically alternating the polarity of the magnets as N-S-N-S. Clustering the magnets allows for use of both vertical legs of current in propulsion, and encourages a higher equivalent frequency of excitation for the composite coils.

When excitation of the rail via brushes is employed, an additional enhancement can be realized which allows for the series connection of the brushes. It is possible to alternately cross-connect the coils to the brush collector plates in such a way as to allow for the excitation of only the leading magnet and the trailing magnet in any one cluster. By using both sides of the vertical rail to inject current, and allowing for the injection of both polarities of current, exciting only the leading magnet brushes and the trailing brushes results in current flowing sequentially through all the coils between these brushes. Such a series excitation of the rail significantly reduces the weight of the vehicle by eliminating a large number of brush injector mechanisms. Secondly, it decreases the maintenance since fewer brushes are employed for the vehicle. Thirdly, it reduces the drag commensurate with the use of the brushes; each brush pad must necessarily be pressed against the side of the collector plates. Fewer pads translates into smaller drag on the vehicle.

Figure 9D:
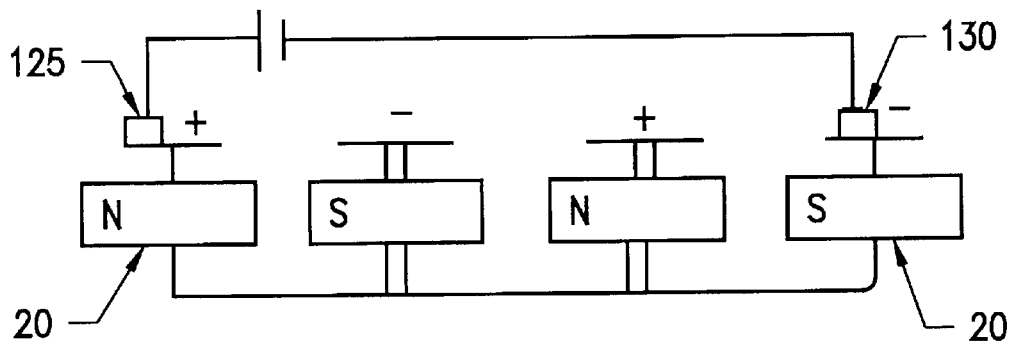
FIG. 9d is a simplified plan view of a recommended series connection of the brushes.

Shown in FIG. 9d is a rough depiction of a series arrangement of the brushes which allows for the advantages of lower vehicle weight, and fewer brush mechanisms. The current is injected into brushes 125 and 130 at only the leading and trailing edge of the magnets 20.

Figure 9E:
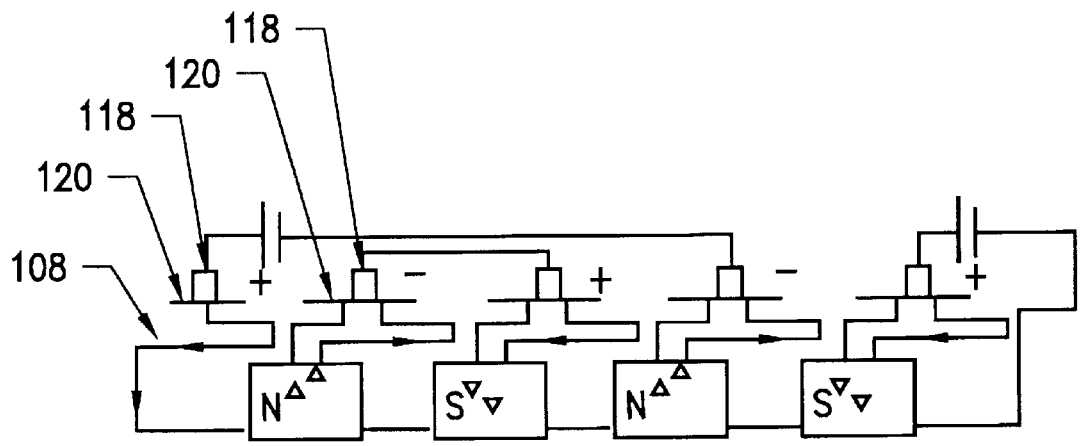
FIG. 9e(a) is a plan view of a design for a brush system which utilizes leading, trailing and intermediate brushes.
Figure 9E:
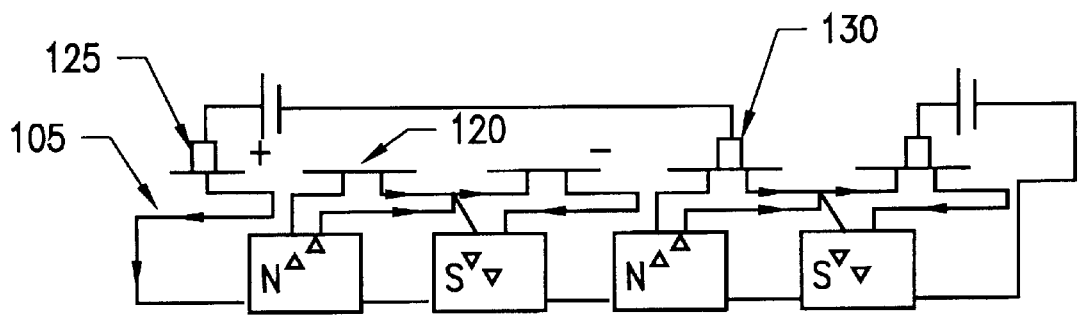

The series arrangement of the brushes sketched in FIG. 9d is shown and described in FIG. 9e in greater detail. A first coil design is shown in FIG. 9(e) inset (a). In this design, to connect the coils 105 in series it is necessary to employ a separate brush 115 connection between all collector plates 120 as shown.

FIG. 9(e) inset (b), however, shows a preferred embodiment which improves upon the design shown in FIG. 9(e) inset (a). In the improved design, every other coil connection is switched. This innovation allows the injection of current using leading magnet brush 125 and trailing magnet brush 130 only, eliminating the need for intermediate brushes. The flow of current indicated by the arrows shows how a undirected force is achieved.

Figure 9F:
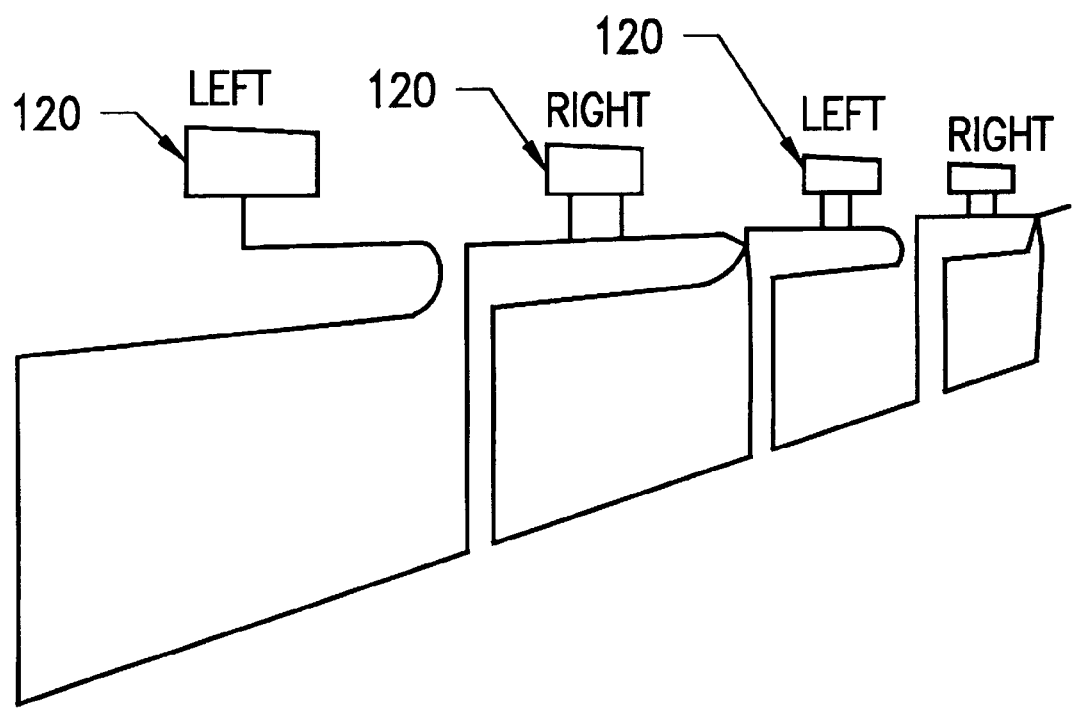
FIG. 9f is a perspective view of connections of the composite coils to the collector plates, in accordance with the embodiment of FIG. 9e(b).

As the magnets are allowed to translate down the track to the next coil section, their polarity would not be correct to yield a force in the same direction as that commensurate with FIG. 9e. Thus, the connection to the collector plates of the unswitched coils must always go to one side of the vertical rail (the left for example), while the switch coil connections must always go to the opposite collector plate. The connections of the coils to the collector plates 120 is depicted by FIG. 9f. This means that at any one time either the left or the right collector plates are excited but never both. Further description of the coils and their interconnections is provided in Appendix B, which is incorporated herein by reference.

Figure 12:
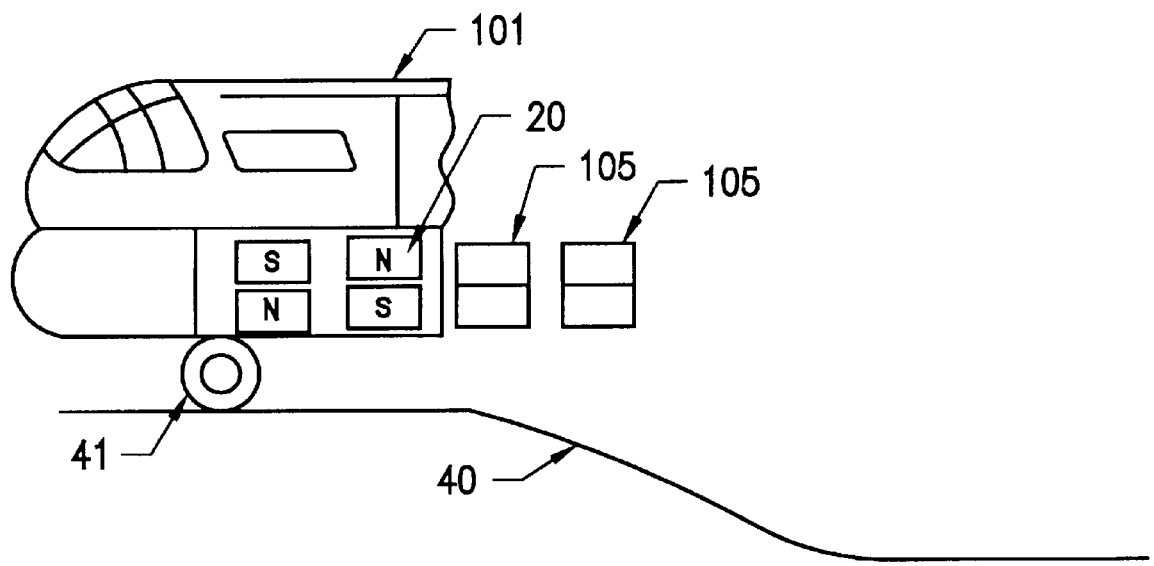
FIG. 12 is a partial side view of a train, in accordance with the present system and also having a past threshold speed to get lift off.

As mentioned in the Summary of the Invention section, the track-based composite coils are incapable of levitating and stabilizing the vehicle at low speeds. One alternative for addressing this problem at low speeds is shown in FIG. 12. Wheels 41 affixed to the bottom of the vehicle 101 are used to support the vehicle 101 at speeds above the peak drag force speed. One of two alternatives are available. First, the wheels can be retracted as with conventional aircraft. Second, the guideway surface 40 can be sloped away from the rail composite coil structure. Note that prior to this point, the height and position of the rails are such that no net flux would be induced in the composite coils due to the centering of the magnets on the composite coils. This eliminates all drag prior to the lift off point.

Figure 13:
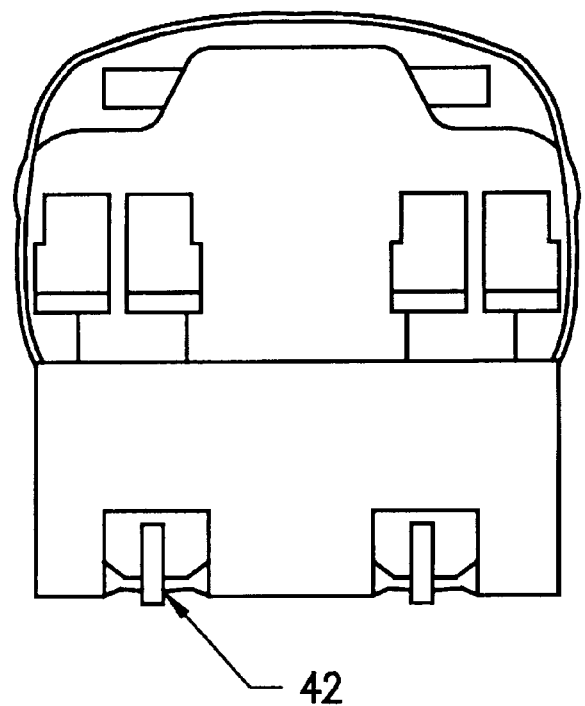
FIG. 13 is a vertical cross-sectional view of a train in accordance with the present invention and showing spring loaded guidance wheels to get stabilization of the train at low speed.

Shown in FIG. 13 is the equivalent use of spring loaded wheels 42 providing lateral guidance for the vehicle. Above the threshold speed, these wheels can be simply retracted. Alternatively, they can be affixed to the vehicle so as to allow some lateral freedom of movement at lower speeds.

Figure 14:
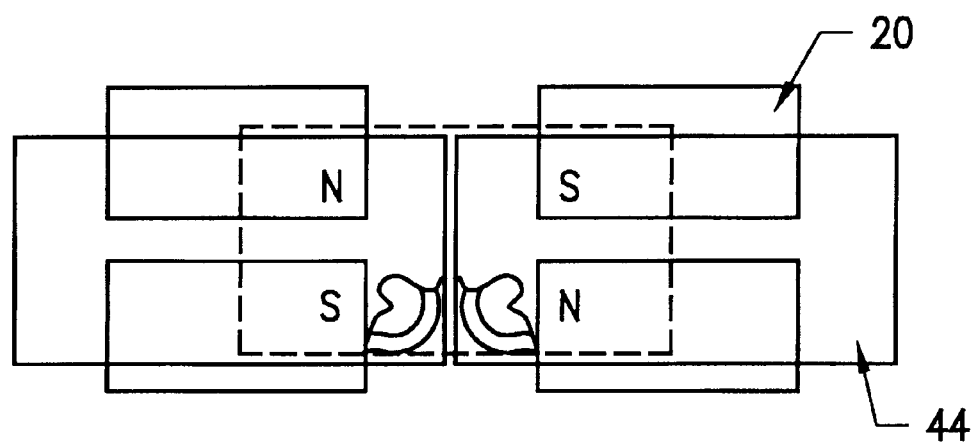
FIG. 14 is a side view of active supplemental lift coils.

FIG. 14 shows another alternative for delivering lift at low speeds. This alternative utilizes an additional coil situated in the track. The leads of this additional active lift coil 44 actually run through the face of the stacked magnets 20 to deliver supplemental lift. They are themselves excited by an additional set of brushes affixed to the rail surface.

Figure 15:
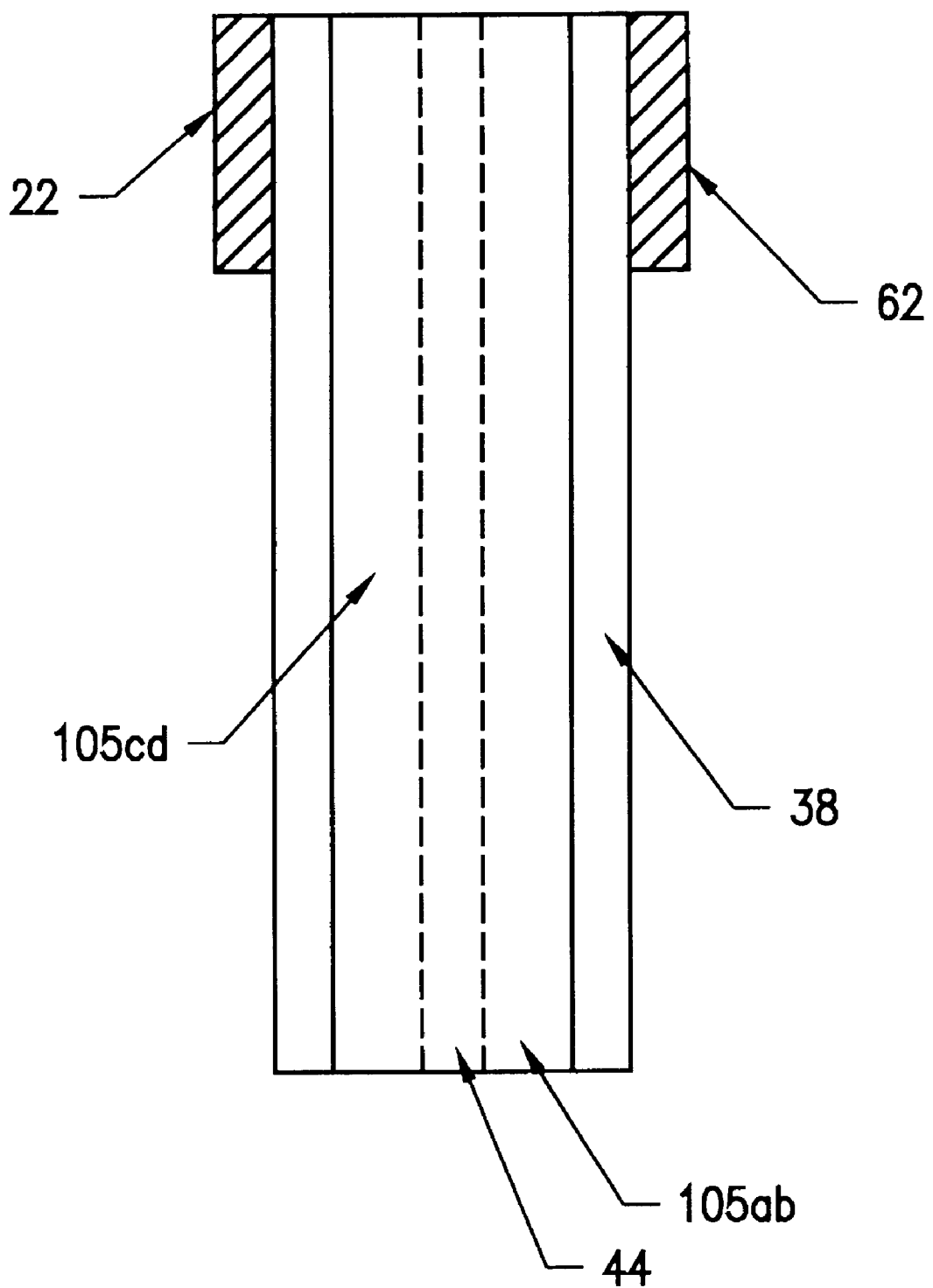
FIG. 15 is a side view of a rail constructed in accordance with the present invention and including active supplemental lift coils.

FIG. 15 shows a cross-section of the rail showing incorporation of both the composite coils and the active supplemental lift coils. The half-coils of the composite coils 105 are displaced both to the left and the right of the rail centerline whereas the active lift coil 44 is positioned centrally within the rail. The brush contact surface 22 continues to provide the current for propulsion while a new contact surface 62 must be utilized to provide additional input for current for the active lift coil. Notice that in this configuration, the pultrusion 38 acts like a sandwich in that it is positioned externally to both the composite and the secondary active lift coils. It is more efficient thermally and electrically to position the composite coils as far outboard of the rail as possible. The configuration for example in FIG. 10 would be more beneficial for thermal cooling as well as enhancing lateral stabilization forces. The ability of the composite coil to deliver guidance is increased by the distance of separation of the left side of the composite coil with respect to the right.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

We claim:

1. A system for transportation using magnetic levitation, comprising:
   (a) a vehicle;
   (b) a track, said track having at least one composite coil, said composite coil having four subcoils electrically connected in parallel;
   (c) means for delivering current to said composite coil; and,
   (d) a magnetic field source, said magnetic field source comprising at least one set of magnets, said magnets being vertically stacked, said vertically stacked magnets facing said composite coil, the magnetic poles of said vertically stacked magnets being arranged such that magnetic pole faces of adjacent magnets alternate in polarity, said magnetic field source mounted to said vehicle, said composite coil and said magnetic field source configured such that said composite coil and said magnetic field source interact to provide a propulsion force for said vehicle when current is delivered to said composite coil, and said magnetic field source and said composite coil further interacting so as to induce forces for the levitation and guidance of said vehicle upon changes in the relative positions of said magnetic field source and said composite coil.

2. A system as in claim 1, further comprising at least two of said composite coils, the second of said coils staggered with respect to the first of said coils.

3. A system as in claim 1, wherein said composite coil is a vertically interleaved composite coil.

4. A system as in claim 1, in which said composite coil comprises two half-coils, said half-coils comprising an upper coil and a lower coil, each of said half-coils having an upper edge, the upper edge of said upper coil being higher than the upper edge of said lower coil, at least a portion of said upper coil and a portion of said lower coil both facing the same magnetic pole face of the same magnet of said magnetic source.

5. A system as in claim 1, in which said composite coil comprises at least a first composite coil and a second composite coil, said first composite coil being housed in a first rail and said second composite coil being housed in a second rail such that said first composite coil and said second composite coil are electrically isolated from each other.

6. A system as in claim 3, in which said means for delivering current into said coil comprises brushes, said vehicle delivering current to said brushes, said brushes delivering current to said composite coil.

7. A system as claimed in claim 6, further comprising:
(a) groupings of said at least one composite coil, said groupings comprising at least four of said composite coils electrically connected in series, each of said composite coils comprising four subcoils electrically connected in parallel;
(b) brush collector plates connected to said groupings, said brush collector plates being electrically conductive plates for electrical contact with said brushes to deliver current from said vehicle to said coils, said composite coils connected to said brush collector plates to form an electrical circuit such that injections of current into a first and a last said composite coil in each of said groupings of coils will result in current flowing through all of said coils of said grouping.

8. A system as claimed in claim 7, further comprising means for injections of current of positive and negative polarity into said composite coils.

9. A system as claimed in claim 7, in which said composite coils are housed in a rail in said track, said current injected into both sides of said rail.

10. A system as claimed in claim 1, in which said magnetic source comprises magnets made of a superconducting material.

11. A system as claimed in claim 1, in which said magnetic source comprises magnets affixed to a back iron, said back iron affixed to said vehicle.

12. A system as claimed in claim 1, further comprising at least two of said composite coils, said composite coils electrically connected in series.

13. A system for the delivery of current to a magnetically levitated vehicle structure, said system comprising brush collector plates connected to groupings of composite coils, said composite coils electrically connected in series, each of said composite coils comprising four subcoils connected in parallel, said brush collector plates connected to said groupings to form an electrical circuit such that delivery of current to a first composite coil and to a last composite coil in each of said groupings of coils will result in current flowing through all of said coils of said grouping.

14. A system as claimed in claim 13, in which said groupings comprise at least four composite coils, and wherein said four composite coils are connected to said collector plates such that delivery of current to said first composite coil and said last composite coil of said grouping of four composite coils causes current to flow through all four of said composite coils.

15. A method for moving a vehicle using magnetic levitation, comprising the steps of:
configuring a track for directing movement of said vehicle, said track comprising at least one composite coil;

mounting a magnetic field source on said vehicle, said magnetic field source having at least one set of magnets, said magnets being vertically stacked, said vertically stacked magnets facing said at least one composite coil of said track;
arranging magnetic poles of said vertically stacked magnets of said magnetic field source such that magnetic pole faces of adjacent magnets alternate in polarity;
interacting said at least one composite coil and said magnetic field source to provide a propulsion force for said vehicle when current is delivered to said composite coil; and
moving said magnetic field source relative to said composite coil such that the interaction of said magnetic field source and said composite coil also induces forces for the levitation and guidance of said vehicle.

16. A system for transportation using magnetic levitation, comprising:
a. a vehicle;
b. a track, said track having at least two composite coils, the second of said coils stuggered with respect to the first of said coils, each of said composite coils having four subcoils electrically connected in parallel;
c. means for delivering current to said composite coils; and
d. a magnetic field source, said magnetic field source mounted to said vehicle, said composite coils and said magnetic field source configured such that said composite coils and said magnetic field source interact to provide a propulsion force for said vehicle when current is delivered to said composite coils, said magnetic field source and said composite coils further interacting so as to also induce forces for the levitation and guidance of said vehicle.

17. A system as in claim 16, in wherein said composite coils are vertically interleaved composite coils.

18. A system as in claim 16, wherein said magnetic field source has at least two magnetic pole faces, and wherein each of said composite coils comprises two half-coils, said half-coils comprising an upper coil and a lower coil, each of said half-coils having an upper edge, the upper edge of said upper coil being higher than the upper edge of said lower coil, at least a portion of said upper coil and a portion of said lower coil both facing the same magnetic pole face of the same magnet of said magnetic source.

19. A system as in claim 16, in which said composite coils comprise at least a first composite coil and a second composite coil, said first composite coil being housed in a first rail and said second composite coil being housed in a second rail such that said first composite coil and said second composite coil are electrically isolated from each other.

20. A system as in claim 16, in which said means for delivering current comprises means for delivering said current from said vehicle to said composite coil.

21. A system as in claim 16, in which said means for delivering current into said composite coils comprises brushes, said vehicle delivering current to said brushes, said brushes delivering current to said composite coils.

22. A system as claimed in claim 21, further comprising:
(a) groupings of said at least one composite coil, said groupings comprising at least four of said composite coils electrically connected in series;
(b) brush collector plates connected to said groupings, said brush collector plates being electrically conductive plates for electrical contact with said brushes to deliver current from said vehicle to said coils, said composite coils connected to said brush collector plates to form an electrical circuit such that injections of current into a first and a last said composite coil in each of said groupings of coils will result in current flowing through all of said coils of said grouping.

23. A system as claimed in claim 22, further comprising means for injections of current of positive and negative polarity into said composite coils.

24. A system as claimed in claim 22, in which said composite coils are housed in a rail in said track, said current injected into both sides of said rail.

25. A system as in claim 16, in which said track comprises at least one vertical rail.

26. A system as in claim 25, in which said composite coil is housed in said rail, said coil comprised of copper wire, each strand of said wire no larger than 0.13 inches in diameter.

27. A system as in claim 26, in which said rail has an upper cap section, said section having a brush contact surface, said vehicle delivering current to said composite coil through said brush contact surface.

28. A system as in claim 16, in which said composite coils are impregnated in a plastic matrix.

29. A system as claimed in claim 28, in which said plastic comprises poly vinyl fiberglass.

30. A system as claimed in claim 16, in which said magnetic source comprises magnets made of a superconducting material.

31. A system as claimed in claim 16, in which said magnetic source comprises magnets affixed to a back iron, said back iron affixed to said vehicle.

32. A system as claimed in claim 16, in which said magnetic source comprises at least one set of magnets, each set having magnets vertically stacked in two facing planes.

33. A system as claimed in claim 32, in which said two facing planes comprise a first plane and a second plane, said two planes flanking said composite coils when said vehicle moves over said composite coils.

34. A system as claimed in claim 33, in which said magnets of said first plane and said magnets of said second plane have magnetic poles, the magnetic poles of the magnets in said first plane facing the magnetic poles of opposite polarity of said magnets in said second plane.

35. A system as claimed in claim 32, in which said magnets have magnetic poles, the magnetic pole faces of adjacent magnets alternating in magnetic polarity.

36. A system as claimed in claim 16, in which said magnetic source comprises at least two planes of vertically stacked magnets, said two planes flanking said composite coils such that the leakage flux of said stacked magnets induces currents in said composite coils when said composite coils are displaced toward one of said planes, said currents inducing forces to restore said composite coils to the prior position of said composite coils between said two planes.

37. A system as claimed in claim 16, in which said vehicle further comprises vertical wheels.

38. A system as claimed in claim 37, in which said vertical wheels are retractable.

39. A system as claimed in claim 37, in which said vertical wheels are mounted within an outer frame of said vehicle.

40. A system as claimed in claim 37, in which said vertical wheels project slightly past an outer frame of said vehicle.

41. A system as claimed in claim 37, in which said vertical wheels are affixed to the bottom of said vehicle.

42. A system as claimed in claim 16, further comprising wheels capable of supporting said vehicle at speeds below approximately 30 miles per hour.

43. A system as claimed in claim 42, in which said wheels ride upon said track.

44. A system as claimed in claim 43, in which said track further comprises a guideway, said guideway having at least one downwardly sloping portion.

45. A system as claimed in claim 16, in which said vehicle further comprises wheels.

46. A system as claimed in claim 45, in which said wheels brace against at least a portion of said track to provide guidance to said vehicle.

47. A system as claimed in claim 40, in which said portion of said track comprises a guideway.

48. A system as claimed in claim 47, in which said portion comprises a rail.

49. A system as claimed in claim 16, wherein said composite coils are staggered such that the composite coils of adjacent horizontal rows horizontally overlap.

50. A system as claimed in claim 16, in which said magnetic source comprises an iron core, said core being wrapped with superconducting wire, said wire being cooled using liquid helium.

* * * * *